Jan. 30, 1951     R. O. DIXSON     2,539,731
DUMP WAGON

Filed June 7, 1947     2 Sheets-Sheet 1

Ralph O. Dixson,
INVENTOR.

BY Lyon & Lyon
ATTORNEYS.

Jan. 30, 1951 R. O. DIXSON 2,539,731
DUMP WAGON
Filed June 7, 1947 2 Sheets-Sheet 2

Ralph O. Dixson,
INVENTOR.

BY Lyon & Lyon
ATTORNEYS

Patented Jan. 30, 1951

2,539,731

UNITED STATES PATENT OFFICE 2,539,731

DUMP WAGON

Ralph O. Dixson, Alhambra, Calif.

Application June 7, 1947, Serial No. 753,331

9 Claims. (Cl. 298—30)

This invention relates to materials handling apparatus and is particularly directed to a device for transporting and dumping materials such as earth, rock, sand, coal, ore, or other bulk material. Devices of this type are commonly employed for earth moving operations and they are subject to rough handling, operation over uneven terrain, exposure to the elements, and, accordingly, are subjected to very severe service.

The principal object of this invention is to provide a device for transporting and dumping bulk material which will operate under severe service conditions and which will dump or spread bulk material in any desired manner and which is of relatively simple rugged construction and not apt to get out of order.

Another object is to provide a heavy duty, high capacity, dump wagon having a mobile frame provided with a hopper and movable quadrant members closing the bottom of the hopper and separable to spread a load transversely of the frame.

A further object is to provide a dump wagon device of this type in which reinforcement is provided around the lower portion of the hopper and in which the sides of the closing quadrants are not subjected to lateral pressure of the load within the hopper, in order that the quadrants may freely operate even though the frame may be tilted at an angle.

Another object is to provide a device of the type described in which a hopper is provided within a box section frame and wherein quadrants movable about independent pivots suspended below the box section are operable to close the bottom of the hopper or to be moved to a partially open position to spread the load during forward movement of the frame.

A further object is to locate the supporting pivots for the closing quadrants relative to the frame in a manner such that the quadrants tend to close by the force of gravity in order that material adhering to the hopper or closing quadrants may be jarred loose by permitting the quadrants to descend by gravity into jarring contact with a common stop member mounted on the lower portion of the hopper between the quadrants.

Other related objects include the provision of cable operated means for operating the quadrants which is mounted on the mobile frame in a position to exclude dirt or other foreign matter and to enable the working parts to be properly lubricated, and to provide a novel form of heavy duty mobile frame having a relatively low center of gravity to prevent overturning of the vehicle when operating on uneven ground, the frame being relatively stiff to avoid undesirable deflections to insure proper operation of the parts under load.

Other objects and advantages will appear hereinafter.

Figure 1:
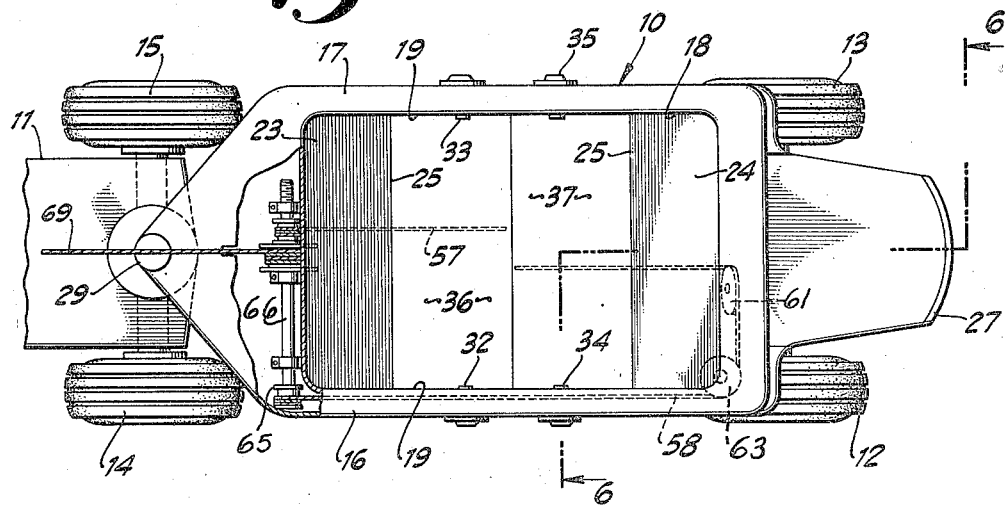
Figure 1 is a top plan view partly broken away showing a preferred embodiment of my invention.
Figure 2:
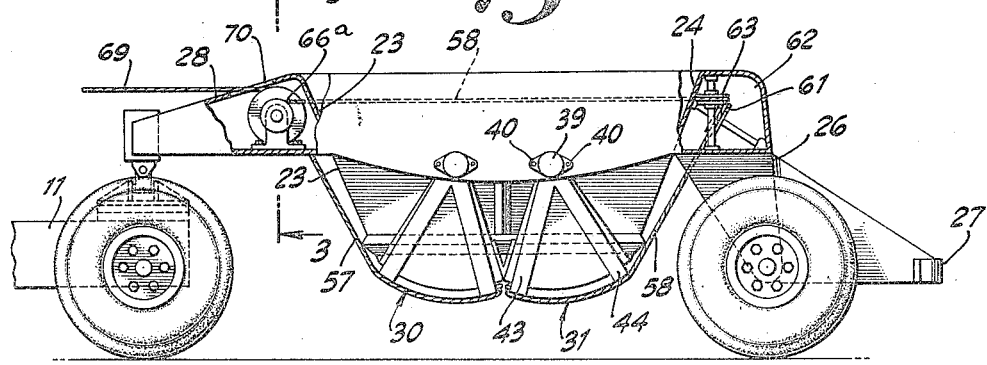
Figure 2 is a side elevation thereof also partly broken away.
Figure 3:
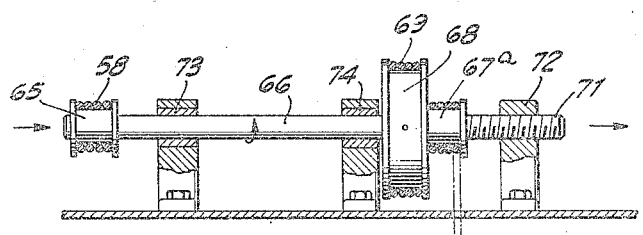
Figure 3 is a sectional elevation in diagrammatic form, taken substantially on the line 3—3 as shown in Figure 2.

Referring to the drawings, the mobile frame generally designated 10 is shown in the form of a semi-trailer adapted to be supported at the front end on a tractor unit 11 and having a pair of rear wheels 12 and 13 for supporting the rearward end thereof. It will be understood that, if desired, the wheels 14 and 15 of the tractor unit 11 could be provided as the front wheels of the mobile frame 10 and a tongue extended forwardly therefrom to a towing vehicle. An advantage of the arrangement shown is that a portion of the weight of the load-carrying device as well as a portion of the load itself is supported on the wheels 14 and 15 in order to increase the traction of the unit 11.

The frame 10 is provided with parallel box sections 16 and 17 which extend longitudinally of the vehicle on opposite sides of the hopper generally designated 18. Each of the box sections 16 and 17 includes a vertical plate 19 which extends vertically from the top of the frame and forms a side wall of the hopper 18. Spaced outwardly from the plate 19 is a parallel plate 20. A connecting cover plate 21 and lower plate 22 cooperate to define the box sections 16 and 17. The members 19, 20, 21 and 22 are preferably joined by welding. Front and rear walls 23 and 24 extend downwardly at an angle and cooperate with the side walls 19 to define the interior of the hopper 18. The hopper 18 is open at the top and is provided with a rectangular opening in the bottom between the lower edges 25 of the front and rear walls 23 and 24 and between the side plates 19.

Downwardly extending struts 26 are provided at the rear end of the frame 10 for supporting the rear wheels 12 and 13. These wheels as well as the tractor wheels 14 and 15 may comprise very large diameter, heavy duty rubber tires, and bearings, not shown, may be provided for individually mounting the wheels 12 and 13 on the struts 26. A bumper member 27 may be provided between the rear wheels 12 and 13 and extending rearwardly therefrom for use in pushing the device should such operation ever become necessary or desirable. The forward end of the frame 10 in front of the forward wall 23 of the hopper 18 is formed as a strut 28 at a relatively high elevation in order to provide clearance for the tractor wheels 14 and 15 during turning operations. The extreme forward end of the strut 28 carries a so-called fifth wheel 29 which provides a universal connection between the tractor 11 and frame 10, permitting tilting movement about mutually perpendicular horizontal axes as well as rotation about the vertical axis.

Figure 6:
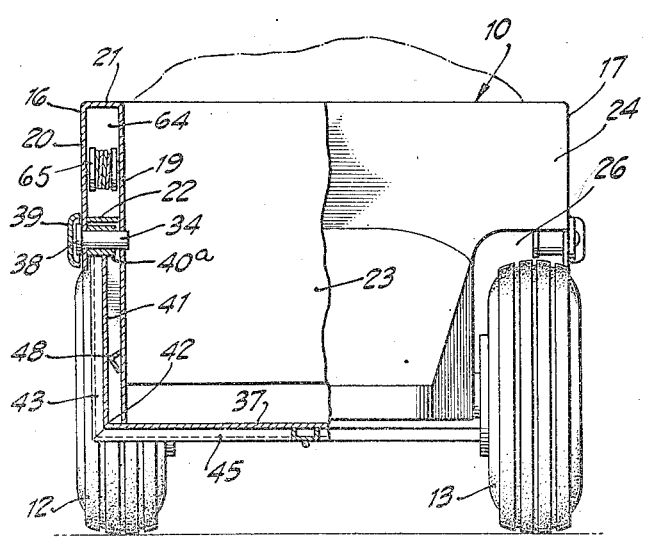
Figure 6 is a rear elevation, partly in section, taken substantially on the line 6—6 as shown in Figure 1.

Means are provided for closing the opening in the bottom of the hopper and, as shown in the drawings, this means includes a pair of quadrant members 30 and 31 which are pivotally mounted on pivot pins for movement about horizontal axes transverse to the longitudinal frame 10. The quadrant 30 is pivotally carried on pins 32 and 33 which are coaxially aligned and supported by the plate members 19 and 20 forming portions of the box sections 16 and 17. The pins 34 and 35 support the quadrant member 31 in a similar fashion. It will be noted that the spacing S between pins 32 and 34 is less than the radius of the curved bottoms 36 and 37 which are formed as a portion of a cylinder having its axis coincident with the axis of the supporting pins. As shown in Figure 6, the pivot pin 34 extends through openings provided in the plates 19 and 20 and is provided with an enlarged head 38 mounted exteriorly of the plate 20. A cap 39 attached to the plate by any convenient means such as the threaded elements 40 prevents the pin from moving out of operative position. A hub 40a rotatably mounted on the pin 34 between the plates 19 and 20 carries a side plate 41 which is shaped similarly to the sector of a circle. The lower curved edge 42 of the side plate 41 is joined to the curved bottom 37 by welding. Stiffener elements 43 and 44 also extend from the hub 40a and at their lower ends join with transversely extending stiffeners 45. The mounting of one side of the quadrant member 31 has been described in detail and it is to be understood that the other side of the quadrant member is constructed in the same manner. Similarly, the construction and manner of support of the quadrant member 30 is substantially identical to that just described for the quadrant member 31.

Figure 5:
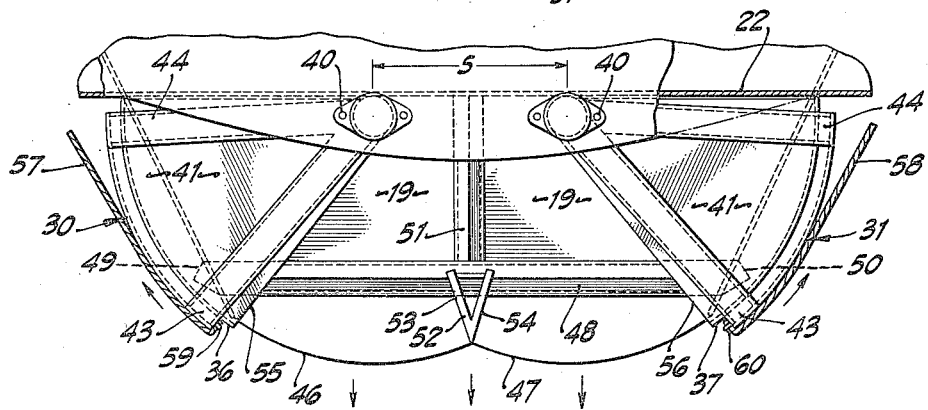
Figure 5 is a view similar to Figure 4, showing the quadrants raised to allow discharge of material from the hopper.

As best shown in Figure 5, the side plates 19 of the hopper 18 are arcuately curved at their lower ends in the form of two intersecting arcs 46 and 47 struck from the pivotal axes of the quadrant members 30 and 31. The curved bottoms 36 and 37 of the quadrant members lie closely adjacent the arcs 46 and 47 when the quadrant members are in their closed position. It will be observed that although the quadrant members 30 and 31 are provided with side plates 41 that these side plates are not subjected to transverse pressure by reason of the load of material carried in the hopper 18. Transverse pressure developed by reason of the presence of material in the hopper 18 is carried by the side plates 19 and a reinforcing stiffener member 48 extends horizontally along the side plates 19 to prevent lateral distortion of the side plates under load. Transverse stiffeners 49 and 50 extend horizontally along the front wall 23 and back wall 24 respectively of the hopper 18. A vertical stiffener 51 may also be provided on each side plate 19 which extends between the member 48 and the plate 22. A V-shaped member 52 is mounted on each side plate 19 centrally thereof above the intersection of the terminal arcuate edges 46 and 47. The members 52 are provided with surfaces 53 and 54 acting as stops to limit the closing movement of the quadrant members 30 and 31 under the influence of gravity. The surface 53 is adapted to be contacted by the edge 55 on the side plate 41 of the quadrant member 30, and, similarly, the surface 54 is adapted to be contacted by the edge 56 of the side plate 41 on the quadrant member 31.

Figure 4:
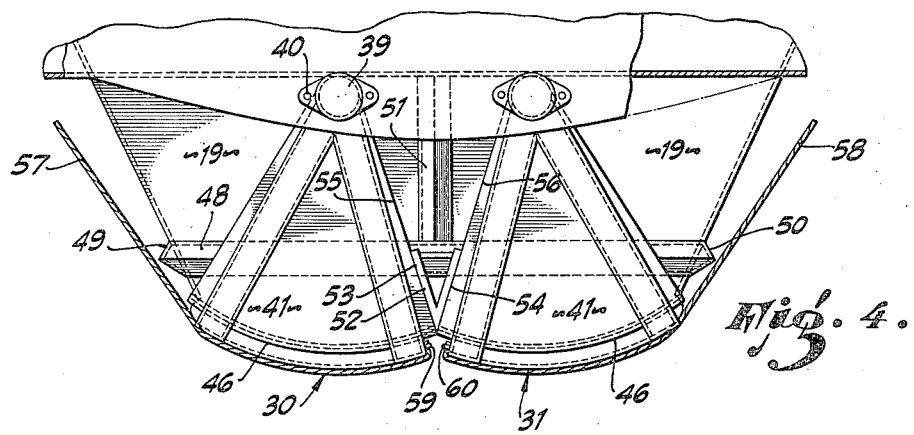
Figure 4 is a side elevation of a portion of the device showing the quadrants in position to close the bottom of the hopper.

Means are provided for moving the quadrant members from the closed position shown in Figure 4 to the fully open position shown in Figure 5, or to any intermediate position as desired, and this means includes flexible cables 57 and 58 secured at 59 and 60 to the quadrant members 30 and 31 respectively. The cable 58 passes over the pulley 61 which is rotatably mounted within the enclosure 62 at the upper and rearward portion of the frame 10. After passing over the angularly mounted pulley 61 the cable 58 extends horizontally to pass over the horizontal pulley 63 which is also rotatably mounted within the enclosure 62. The cable 58 then passes through the space 64 within the box section 16 and is wound on a spooling drum 65 at one end of a shaft 66. The shaft 66 is mounted in an enclosure 66a provided on the frame 10 near the forward end of the vehicle.

The cable 57 is similarly spooled on the drum 67a so that upon rotation of the shaft 66 the cables 57 and 58 are simultaneously spooled or unspooled on their respective drums. A power drum 68 is also fixed on the shaft 66 and is adapted to receive a flexible cable 69 which extends forwardly through an opening 70 provided in the frame 10 for actuation by power means, not shown, carried on the tractor 11. When the cable 69 is pulled toward the tractor 11, the shaft 66 is caused to rotate and the cables 57 and 58 are spooled upon their respective drums 67a and 65, thereby moving the quadrants 30 and 31 to open position. It is to be understood that the mechanism, not shown, for applying tension to the cable 69 is capable of holding the line at any desired point so that the quadrants 30 and 31 may be opened to any desired extent. In this manner the load in the hopper 18 may be spread transversely of the vehicle as it rolls forward. If desired, means may be provided for facilitating proper spooling of the various cables on their respective drums, and, as shown in the drawings, this means may include a threaded portion 71 on the shaft 66 which passes through a stationary bracket 72 having a threaded opening. When the cable 69 causes the drum 68 to rotate, the shaft 66 is turned and also progressed axially by the thread 71 so that the lateral position of the cables 69, 57 and 58 remains substantially unchanged. Bearings 73 and 74 may be provided for supporting the shaft for rotary and longitudinal movement.

The spacing of the pivot pins 32—33 and 34—35 is such that the quadrants 30 and 31 tend to close by gravity. As pointed out above, the spacing S between the pivot pins is less than the radius of the curved bottoms 36 and 37 of the quadrant members 30 and 31. If material within the hopper 18 should stick for any reason, it may be effectively jarred loose by permitting the quadrants 30 and 31 to descend under gravity and strike the stop member 62 with a jarring blow.

Having fully described my invention, it is to be understood that I do not wish to be limited to the details herein set forth, but my invention is of the full scope of the appended claims.

I claim:

1. Apparatus for transporting materials, comprising in combination: a mobile frame including a hopper having an open bottom, the frame having parallel beam sections extending longitudinally along the upper portion thereof, each beam section including an inner plate forming one of the sides of the hopper and a spaced outer plate parallel thereto, cooperating means for closing the hopper bottom comprising a pair of quadrant members extending transversely of the frame, means positioned between the inner and outer plates pivotally supporting each quadrant member on the frame, said means including coaxial pivot pins each projecting through one of said inner plates and one of said outer plates, and means including flexible cables for moving the quadrant members to an inoperative position to expose the open bottom of the hopper.

2. Apparatus for transporting materials, comprising in combination: a mobile frame including a hopper having an open bottom, the frame having parallel beam sections extending longitudinally along the upper portion thereof, each beam section including an inner plate forming one of the sides of the hopper and a spaced outer plate parallel thereto connected by vertically spaced horizontally extending spacers, cooperating means for closing the hopper bottom comprising a pair of quadrant members extending transversely of the frame, means positioned between the inner and outer plates pivotally supporting each quadrant member on the frame, said means including coaxial pivot pins each projecting through one of said inner plates and one of said outer plates at a position below the lower spacer, and means including flexible cables for moving the quadrant members to an inoperative position to expose the open bottom of the hopper.

3. Apparatus for transporting materials, comprising in combination: a mobile frame including a pair of parallel beam sections extending longitudinally along the upper portion thereof, each beam section including inner and outer parallel vertical plates transversely spaced, the inner plate of each beam section extending downwardly to form two parallel sides of a hopper provided on the frame, means on the frame extending between said parallel sides and forming front and rear walls of the hopper, the hopper having an open bottom, cooperating means for closing the hopper bottom comprising a pair of separable quadrant members extending transversely of the frame, means pivotally supporting each quadrant member on the frame including co-axial pivot pins each projecting through one of the inner plates and one of the outer plates, and hub means turnable on the pins between the plates adapted to support each quadrant member on the pivot pins.

4. Apparatus for transporting materials, comprising in combination: a mobile frame including a pair of parallel beam sections extending longitudinally along the upper portion thereof, each beam section including inner and outer parallel vertical plates transversely spaced, the inner plate of each beam section extending downwardly to form two parallel sides of a hopper provided on the frame, means on the frame extending between said parallel sides and forming inclined front and rear walls of the hopper, the hopper having an open bottom, cooperating means for closing the hopper bottom comprising a pair of separable quadrant members extending transversely of the frame, means positioned between the inner and outer plates pivotally supporting each quadrant member on the frame including co-axial pivot pins each projecting through one of the inner plates and one of the outer plates, and means for separating the quadrant members and for moving them to an inoperative position adjacent the inclined walls of the hopper to expose the open bottom of the hopper.

5. Apparatus for transporting materials, comprising in combination: a mobile frame including a hopper having an open bottom, the frame having parallel beam sections extending longitudinally along the upper portion thereof, each beam section including an inner plate forming one of the sides of the hopper and an outer plate parallel thereto, cooperating means for closing the hopper bottom comprising a pair of quadrant members extending transversely of the frame, means pivotally supporting each quadrant member on the frame, said means including coaxial pivot pins each projecting through one of said inner plates and one of said outer plates, and a stop element fixed on the outer face of each of said inner plates adapted to limit pivotal movement of both quadrant members toward closed position.

6. Apparatus for transporting materials, comprising in combination: a mobile frame including parallel vertical side walls and inclined end walls cooperating to define a hopper, the hopper having an open bottom, said side walls extending longitudinally of the frame and each having its lower edge symmetrically curved in two intersecting convex arcs, a pair of cooperating quadrant members pivotally mounted on the frame and adapted to close the hopper bottom, the quadrant members each having a curved bottom lying adjacent one of the convex arcs on the lower edge of each side wall, power operated means for separating the quadrant members and for moving them to an inoperative position adjacent the inclined end walls of the hopper, and a stop element fixed on each side wall adjacent the intersection of said convex arcs adapted to limit pivotal movement of both quadrant members toward closed position.

7. Apparatus for transporting materials, comprising in combination: a mobile frame including a pair of parallel beam sections extending longitudinally along the upper portion thereof, each beam section including inner and outer parallel vertical plates transversely spaced, the inner plate of each beam section extending downwardly to form two parallel sides of a hopper provided on the frame, the lower terminal edge of each side being symmetrically curved in two intersecting convex arcs, means on the frame extending transversely between said longitudinal sides and forming inclined front and rear walls of the hopper, the hopper having an open bottom, a pair of cooperating quadrant members extending transversely of the frame and adapted to close the hopper bottom, means positioned between the inner and outer plates pivotally supporting each quadrant member on the frame including co-axial pivot pins each projecting through one of the inner plates and one of the outer plates, the quadrant members each having a curved bottom lying adjacent one of the convex arcs on the lower edge of each side plate, and power operated means for separating the quadrant members and for moving them in an inoperative position adjacent the inclined end walls of the hopper.

8. Apparatus for transporting materials, comprising in combination: a mobile frame including a pair of parallel beam sections extending longitudinally along the upper portion thereof, each beam section including inner and outer parallel vertical plates transversely spaced, the inner plate of each beam section extending downwardly to form two parallel sides of a hopper provided on the frame, the lower terminal edge of each side being symmetrically curved in two intersecting convex arcs, the hopper having an open bottom, a pair of cooperating quadrant members extending transversely of the frame and adapted to close the hopper bottom, means positioned between said plates for supporting the quadrant members for pivotal movement on the frame about longitudinally spaced transverse axes, the quadrant members each having a curved bottom, said curved bottoms and convex arcs on the lower edge of each side plate being struck from the pivotal axes as centers, and power operated means for actuating the quadrant members.

9. Apparatus for transporting materials, comprising in combination: a mobile frame including a pair of parallel beam sections extending longitudinally along the upper portion thereof, each beam section including inner and outer parallel vertical plates transversely spaced, the inner plate of each beam section extending downwardly to form two parallel sides of a hopper provided on the frame, the lower terminal edge of each side being symmetrically curved in two intersecting convex arcs, the hopper having an open bottom, a pair of cooperating quadrant members extending transversely of the frame and adapted to close the hopper bottom, means pivotally supporting each quadrant member on the frame including coaxial pivot pins each projecting through one of the inner plates and one of the outer plates, hub means turnable on the pivot pins between the plates adapted to support each quadrant member on the pivot pins, the quadrant members each having a curved bottom, said curved bottoms and convex arcs on the lower edge of each side plate being struck from the pivotal axes as centers, and power operated means for actuating the quadrant members.

RALPH O. DIXSON.

REFERENCES CITED

The following references are of record in the file of this patent:

UNITED STATES PATENTS

| Number | Name | Date |
| --- | --- | --- |
| 599,820 | Sage | May 13, 1902 |
| 718,868 | Randel | Feb. 3, 1903 |
| 760,499 | Van Deusen | May 24, 1904 |
| 763,706 | Wolff et al. | June 28, 1904 |
| 849,965 | Blackwood | Apr. 9, 1907 |
| 877,884 | Collins | Jan. 28, 1908 |
| 1,109,601 | Steinmeyer | Sept. 1, 1914 |
| 2,231,545 | Myers | Feb. 11, 1941 |
| 2,428,533 | Simmons | Oct. 7, 1947 |